United States Patent [19]

Gloth et al.

[11] 4,205,160

[45] May 27, 1980

[54] INDANE CONTAINING POLYMERS

[75] Inventors: Richard E. Gloth, Copley; James J. Tazuma, Stow, both of Ohio

[73] Assignee: The Goodyear Tire & Rubber Company, Akron, Ohio

[21] Appl. No.: 665,838

[22] Filed: Mar. 11, 1976

[51] Int. Cl.² .......................................... C08G 83/00
[52] U.S. Cl. ................................. 528/425; 526/280; 526/336
[58] Field of Search .............. 260/2 R, 2 H; 526/336, 526/11.1; 528/425

[56] References Cited

FOREIGN PATENT DOCUMENTS 850363 10/1960 United Kingdom .

OTHER PUBLICATIONS

Brunner, J. Polymer Science, 28, 629–630, 1958.
D'Onofrio, J. Applied Polymer Science, 8, 521–525, 1964.
Chemical Abstracts, vol. 64, No. 14371c, Ruetgerswerke, 1966.

*Primary Examiner*—Paul R. Michl
*Attorney, Agent, or Firm*—J. P. Ward

[57] ABSTRACT

The invention relates to polymers containing units of indane, 1-pentene and 2-pentene. These polymers can be formed by the polymerization of meta- or para-diisopropyl benzene diol or by the polymerization of meta- or para-diisopropenyl benzene in the presence of acid activated clay or other acidic catalysts.

5 Claims, No Drawings

INDANE CONTAINING POLYMERS

The present invention relates to the preparation of new polymers which contain high percentages of indane, to the polymers and to products made with these new polymers.

The polymerization of diisopropenyl benzene in solution to yield soluble polymers which contain indane groups has been described by Brunner et al (J. Polymer Sci. 28, 629 (1958). They employed Lewis acid type polymerization catalysts to produce polyindane compositions having softening points of 250° C. and higher. Similarly A. A. D'Onofrio (J. App. Polymer Sci., 8, 521 (1964) has shown that polymerization of diisopropenyl benzene with butyl lithium—titanium tetrachloride—hydrogen chloride catalyst yielded polyindanes with softening points above 268° C. Brunner and Walbridge (Brit. 850,363) show other examples of products obtained from polymerization of diisopropenyl benzene in which the softening points were 222°–230° C., 103°–114° C. and 67°–72° C. The structure of the low softening products was not indicated. Thus prior art describes products with low softening points of below 103°–114° C. and with relatively high softening points of 222°–230° C. and higher.

Now according to the present invention new polymers are provided which are polymers containing units of indane, 1-pentene and 2-pentene structures and which have softening points in the range of from 120° to 200° C., number average molecular weights in the range of 800–2000, and an indane content of from 20 percent to 100 percent. The units present in the polymers are thought to have structures represented by the formulas

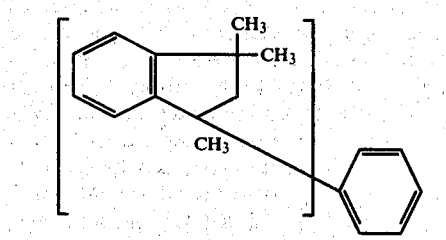
(I)

1,1,3-trimethyl-3-phenylindane

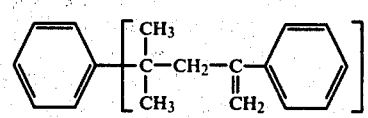
(II)

2,4-diphenyl-4-methyl-1-pentene

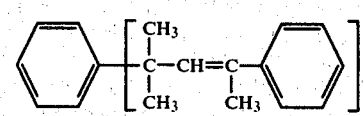
(III)

2,4-diphenyl-4-methyl-2-pentene. The bracketed portions of the formulas represent repeating structural units of the polymers described in this application. These units are referred to in this specification as indane, 1-pentene, and 2-pentene, respectively.

The new polymers are useful as lubricants and as molding aids for crystallizable polyester resins, especially polyethylene terephthalate.

The new materials are prepared from 1,3 diisopropyl benzene diol

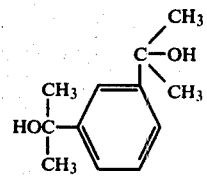

also appropriately known as meta diisopropylbenzene diol; 1,4-diisopropylbenzene diol

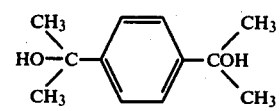

also appropriately known as para diisopropylbenzene diol; and from mixtures of these diols; 1,3-diisopropenylbenzene; 1,4-diisopropenylbenzene and/or mixtures of the 1,3- and 1,4-diisopropenylbenzene. Diisopropylbenzene diols will be referred to as meta or para diol and the diisopropenylbenzenes will be referred to as meta or para DIB for convenience.

Preparation of the new materials is illustrated in the following examples in which parts and percentages are by weight unless otherwise specified.

EXAMPLE 1

Fifty grams (0.257 mol) para diol, 250 milliliters toluene and 7.5 grams of Super Filtrol Grade 1 predried at 100°–120° C., 0.5 mm. where charged into a flask equipped with a condenser with a Dean-Stark trap and a stirrer having a Teflon blade. This mixture was heated to reflux with rapid stirring. Once water of reaction began to collect, reflux was continued for 1.5 hours. The mixture was then filtered. Evaporation of solvent yielded 42.55 grams of white solid, softening point range 130°–136° C., Ring and Ball softening point 144° C. The unit composition of the polymer was 3 percent 2-pentene, 5 percent 1-pentene, 92 percent indane.

EXAMPLE 2

21.57 grams of Super Filtrol Grade 1 and 432 milliliters of toluene was stirred rapidly and heated to reflux until any moisture present had been removed azeotropically. A boiling solution of 86.31 grams (0.444 mol) of para diol in 500 milliliters of toluene was then added dropwise over a 50 minute period. Stirring at reflux temperature was then continued for 130 minutes. Filtration of the mixture followed by evaporation of the solvent yielded 73.47 grams of nearly white solid, softening point range 187°–193° C. The unit composition of the polymer was 2 percent 1-pentene, 2 percent 2-pentene and 96 percent indane.

EXAMPLE 3

25 grams (0.1285 mol) of para diol and 2.78 grams of boron trifluoride diethyl etherate (equivalent to 1.25 grams boron trifluoride) were added to 250 milliliters of dry toluene. The mixture was stirred and heated at reflux for 1.5 hours. 4.2 milliliters of water was collected within the first 15 minutes. 2.5 grams of calcium hydroxide was added to the reaction mixture at the end of the reflux period. Filtration of the mixture followed by evaporation of the solvent yielded 18.77 grams of white crystals, softening point range 125°–134° C. The unit composition of the polymer was 31 percent 1-pentene, 45 percent 2-pentene and 24 percent indane.

EXAMPLE 4

1.25 grams of p-toluenesulfonic acid and 25 grams (0.1285 mol) of para diol were added to 250 milliliters of dry toluene. The mixture was stirred and heated at reflux for 1.5 hours, during which time water of reaction was collected in a Dean-Stark trap. The resulting solution was cooled to 90° C. 50 milliliters of 6 percent sodium carbonate solution was added with stirring. Filtration followed by evaporation of solvent yielded 14.30 grams of white solid, softening point range 146°–154° C. The unit composition of the polymer was similar to that of the polymer prepared in Example 3.

EXAMPLE 5

50 grams (0.257 mol) meta diol, 250 milliliters toluene and 7.5 grams of Super Filtrol Grade 1 predried at 100°–120° C., 0.5 mm. were heated to reflux with rapid stirring. Once water of reaction began to collect, reflux was continued for 1.5 hours. The mixture was then filtered. Evaporation of solvent yielded a light yellow solid, softening point range 181°–190° C. The polymer consisted of over 90 percent indane units.

EXAMPLE 6

50 grams (0.316 mol) para DIB, 7.5 grams Super Filtrol Grade 1 predried at 100°–120° C., 0.5 mm. and 167 milliliters toluene were heated to reflux with rapid stirring. After a 90 minute reflux period a 25 milliliter aliquot was withdrawn, filtered, and evaporated. The remainder of the reaction mixture was refluxed for a total of three hours before being filtered and evaporated. Both the 90 minute and the 3 hour products were nearly white solids.

| 90 Minute Product | |
|---|---|
| Softening point range | 136°–143° C. |
| 2 Percent 1-pentene | |
| 4 Percent 2-pentene | |
| 94 Percent indane | |
| Three Hour Product | |
| Melting Point | 157°–165° C. |
| 5 Percent 2-pentene | |
| 95 Percent indane | |

EXAMPLE 7

A solution of 50 grams (0.316 mol) para DIB in 100 milliliters toluene was added over a period of five minutes to 2.5 grams Super Filtrol Grade 1 stirred in 20 milliliters refluxing toluene. When addition was complete a 25 milliliter aliquot was removed, filtered, and evaporated to yield a colorless viscous liquid. Subsequent samples were removed and worked up at 30, 60, 90 and 180 minutes. Softening point ranges and structural composition are set out in Table I below.

TABLE I

| Time Minutes* | SP Range | 1-Pentene | 2-Pentene | Indane |
|---|---|---|---|---|
| 0 | visc. liquid | 53% | 10% | 36% |
| 30 | 134°–8° C. | 4 | 10 | 86 |
| 60 | 134°–41° | — | 3 | 97 |
| 90 | 137°–44° | — | 3 | 97 |
| 180 | 140°–46° | — | 2 | 98 |

*(After addition completed)

EXAMPLE 8

A solution of 2.78 grams of boron trifluoride diethyl etherate (equivalent to 1.25 grams of boron trifluoride) in 250 milliliters of toluene was stirred and heated to reflux. A solution of 25 grams (0.158 mol) of para DIB was added within three minutes. Stirring at reflux was continued for 1.5 hours. 2.5 grams of calcium hydroxide was then added to the reaction mixture. Stirring was continued for 15 minutes. The mixture was filtered. Evaporation of the solvent yielded 21.19 grams of white resin, softening point range 121°–130° C. The unit composition of the polymer was 17 percent 1-pentene, 28 percent 2-pentene and 55 percent indane.

EXAMPLE 9

Ten grams (0.063 mol) of meta DIB in 115 milliliters of toluene and 1.5 grams of Super Filtrol Grade 1 predried at 100°–120° C., 0.5 mm. were stirred and heated at reflux for 1.5 hours. Filtration of the reaction mixture followed by evaporation of solvent yielded 8.33 grams of white resin, softening point range 135°–144° C. The unit composition of the polymer was 15 percent 1-pentene, 15 percent 2-pentene and 70 percent indane.

The catalysts useful in preparing the new materials include acidic clay catalysts such as Super Filtrol or silica-alumina catalysts such as Mobil's Durabead I. The Filtrols are acid-activated crystalline clays composed essentially of silica and alumina. They are available from Filtrol Corporation, 5959 West Centry Blvd., Los Angeles, Calif. 90045. The acid numbers of these clays range from 1.2 to 16. Super Filtrol Grade 1 has an acid number of 8. Other acid treated clays can also be used such as the Girdler K-series catalysts which are acid-activated clays produced from the mineral Montmorillonite, an aluminum hydrosilicate with ideal formula

$$Al_2O_3.4SiO_2.H_2O + XH_2O$$

They are available from Girdler Chemical, Inc., P.O. Box 337, Louisville, Ky. 40201. Their acidity ranges from pH 2.1 to pH greater than 4.

Also, Durabead catalysts, nonzeolitic coprecipitated silica-aluminas of low crystallinity, can be used. They are available from Mobil Oil Corporation, Chemical Division, 150 East 42nd St., New York, N.Y. Other effective catalysts include Bronsted acids such as p-toluenesulfonic acid and Lewis acids such as boron trifluoride. Amounts of catalysts used varied from 5 to 15 weight percent of diol or DIB.

The structural composition of the polymers was determined by nuclear magnetic resonance spectroscopy.

Ring and ball softening points were determined in accordance with ASTM Method D36-70. The softening point ranges were determined in a Thomas-Hoover capillary melting point apparatus and represent the temperature at which a sample begins to soften and that at which it has coalesced.

Table II lists pertinent data for representative polymeric products. SF1 is Super Filtrol Grade 1. KSF is a Girdler K-series catalyst of pH 2.1.

TABLE II

| Reagent | Weight % Catalyst | Solvent | Reaction Time | Softening Point Range | Number Average Mol.Wt. |
|---|---|---|---|---|---|
| Para-diol | 5% SF1 | Toluene | 1.5 Hr. | 184°–195° C. | 1520 |
| Para-diol | 15% SF1 | Toluene | 1.5 Hr. | 122°–131° C. | 1280 |
| Para-diol | 15% KSF | Toluene | 1.5 Hr. | 139°–146° C. | 1030 |
| Para-diol | 15% KSF | Xylene | 1.5 Hr. | 124°–132° C. | 975 |
| Meta-diol | 15% SF1 | Toluene | 1.5 Hr. | 181°–190° C. | 1610 |
| Para-DIB | 15% SF1 | Toluene | 1.5 Hr. | 156°–163° C. | 1090 |

While certain representative embodiments and details have been shown for the purpose of illustrating the invention it will be apparent to those skilled in this art that various changes and modifications may be made therein without departing from the spirit or scope of the invention.

What we claim is:

1. The method which comprises treating a material selected from the group consisting of 1,3-diisopropyl benzene diol, 1,4-diisopropyl benzene diol or mixtures of 1,3- and 1,4-diisopropyl benzene diols with an acidic clay, silica alumina, Bronsted acid or Lewis acid catalyst in the presence of a water azeotroping agent at temperature at which the azeotroping agent refluxes and removes water from the system for a time sufficient to form a resin having an average softening point of 120° C. to 200° C. and an indane unit content of about 20 to 100 mol percent.

2. The method of claim 1 in which the azeotroping agent is toluene.

3. The method of claim 1 in which the acid treated clays are used as catalysts.

4. The method of claim 1 in which the Bronsted acid is p-toluenesulfonic acid.

5. The method of claim 1 in which the Lewis acid is selected from the group consisting of boron trifluoride and boron trifluoride diethyl etherate.

* * * * *